US007548796B2

(12) United States Patent
Tanaka et al.

(10) Patent No.: US 7,548,796 B2
(45) Date of Patent: Jun. 16, 2009

(54) METHOD, APPARATUS, AND PROGRAM FOR CONTROLLING TEMPERATURE WITHIN A HEATING SYSTEM

(75) Inventors: Masahito Tanaka, Okayama (JP); Ikuo Nanno, Okayama (JP); Akira Takaishi, Okayama (JP)

(73) Assignee: Omron Corporation, Kyoto-Shi (JP)

( * ) Notice: Subject to any disclaimer, the term of this patent is extended or adjusted under 35 U.S.C. 154(b) by 449 days.

(21) Appl. No.: 11/331,345

(22) Filed: Jan. 13, 2006

(65) Prior Publication Data

US 2006/0173646 A1    Aug. 3, 2006

(30) Foreign Application Priority Data

Jan. 17, 2005    (JP)    ............................ P2005-008926
Nov. 29, 2005    (JP)    ............................ P2005-343477

(51) Int. Cl.
*G06F 19/00*    (2006.01)
*C03B 9/41*    (2006.01)
*G05B 21/00*    (2006.01)
*G05D 23/00*    (2006.01)

(52) U.S. Cl. ........................ 700/210; 700/157; 700/158; 700/274; 700/299; 700/300

(58) Field of Classification Search ......... 700/157–158, 700/210, 274, 299–300
See application file for complete search history.

(56) References Cited

U.S. PATENT DOCUMENTS

| 3,860,406 | A | * | 1/1975 | Basler et al. ................... 65/91 |
| 3,954,433 | A | * | 5/1976 | Holler ........................ 65/29.21 |
| 4,004,138 | A | * | 1/1977 | Morooka et al. ............. 700/276 |
| 4,028,083 | A | * | 6/1977 | Patznick et al. ............. 65/29.21 |
| 4,223,385 | A | * | 9/1980 | Miller et al. ................. 700/210 |
| 4,394,121 | A | * | 7/1983 | Wakamiya et al. ............ 432/11 |
| 4,501,125 | A | * | 2/1985 | Han ............................. 62/175 |
| 4,501,552 | A | * | 2/1985 | Wakamiya .................... 432/49 |
| 4,622,059 | A | * | 11/1986 | Brown ........................... 65/160 |
| 4,807,144 | A | * | 2/1989 | Joehlin et al. ............... 700/205 |
| 5,291,514 | A | * | 3/1994 | Heitmann et al. ........... 373/135 |
| 5,358,541 | A | * | 10/1994 | Kindall ...................... 65/29.17 |
| 5,693,110 | A | * | 12/1997 | Iwaihara et al. ............ 65/29.11 |
| 6,164,816 | A | * | 12/2000 | Aderhold et al. .............. 374/1 |
| 6,606,537 | B1 | * | 8/2003 | Kazmierowicz et al. ..... 700/210 |
| 6,772,610 | B1 | * | 8/2004 | Albrand et al. ............... 65/162 |
| 6,799,712 | B1 | * | 10/2004 | Austen et al. ............... 228/102 |
| 2002/0134109 | A1 | * | 9/2002 | Vitkala ....................... 65/29.15 |
| 2003/0231697 | A1 | * | 12/2003 | Fortner et al. ............... 374/179 |

FOREIGN PATENT DOCUMENTS

CN    1609741    4/2005

* cited by examiner

*Primary Examiner*—Ronald D Hartman, Jr.
(74) *Attorney, Agent, or Firm*—Foley & Lardner LLP

(57) ABSTRACT

A temperature variation of a glass substrate 2 at a plurality of measuring points in a continuous furnace 3 when preset temperatures of respective furnaces $3_1$-$3_3$ are changed is estimated in the form of a matrix based on a model, an inverse matrix of the matrix is used so as to calculate correction values in such manner that a temperature of the glass substrate 2 corresponds to a temperature of a desired temperature profile, and the preset temperatures are corrected based on the correction values.

8 Claims, 7 Drawing Sheets

METHOD, APPARATUS, AND PROGRAM FOR CONTROLLING TEMPERATURE WITHIN A HEATING SYSTEM

BACKGROUND OF THE INVENTION

1. Field of the Invention

The present invention relates to a temperature control method and a temperature control apparatus for controlling a temperature of an object to be heat-treated. The present invention further relates to a heat treatment apparatus in which the temperature control apparatus is adapted for use. Still further, the present invention relates to a program for use with the apparatuses and method of the present invention. More specifically, the present invention relates to a method for controlling the temperature of an object within a multi-input/output interference system.

2. Description of the Related Art

With regards to related art, a continuous furnace comprising a plurality of heat treatment zones which is conventionally used for heating a flat panel display ("FPD") is shown in Unexamined Japanese Patent Publication No. 2003-279256.

SUMMARY OF THE INVENTION

In the heat treatment using the continuous furnace, an object to be heat-treated such as the glass substrate is run in a plurality of furnaces continuously in the horizontal direction to be subjected to the heat treatment therein. It is necessary for the heat treatment to be applied so that a temperature profile showing how the temperature of the heat-treatment object running in the continuous furnaces changes overtime corresponds to a targeted desirable temperature profile. In order to closely match the desired profile, preset temperatures of the plurality of continuous furnaces and the like are adjusted.

Conventionally, in the adjustment of the preset temperatures and the like, first, a temperature profile of a test heat-treatment object provided with a temperature sensor that is run in the continuous furnaces is measured. Then, the preset temperatures of the respective furnaces and the like are adjusted so that the measured temperature profile corresponds to the desired temperature profile. However, this adjustment requires an experienced and skilled technician and the resulting adjustments are often imprecise. As another disadvantage, significant time and a number of steps are required because the object to be heat-treated must be repeatedly run in the continuous furnaces to make the necessary adjustments.

The present invention was implemented in order to solve the foregoing problems, and a main object thereof is to allow accurate and timely adjustments to heating elements in order to apply the proper heat treatment to an object.

A temperature control method according to a first aspect of the present invention includes a method of controlling temperatures of a plurality of heat-treatment zones in a heat treatment applied to an object to be heat-treated while the object is moved in the plurality of continuous heat-treatment zones, wherein a correction value for correcting at least one of a targeted temperature and a detected temperature of each of the heat-treatment zones is calculated based on a difference between a temperature of the heat-treatment object and a temperature of a desired temperature profile.

The heat treatment preferably includes a heating treatment and a cooling treatment. The heat-treatment zone is preferably an interval (range) to which the heat treatment is applied. The heat-treatment zones are preferably respectively provided with at least a heating device and/or a cooling device so that the temperature may be controlled in each of the heat-treatment zones.

In the plurality of continuous heat-treatment zones, the respective heat-treatment zones may be continuous in the horizontal direction or in the vertical direction.

The temperature of the heat-treatment object is preferably measured while the heat-treatment object is moved in the plurality of heat-treatment zones in the same manner as in the heat treatment, or may measure an initial temperature of the object to be heat-treated prior to application of the heat treatment thereto.

The correction value is preferably a value capable of minimizing the difference between the temperature of the heat-treatment object and the temperature of the desired temperature profile.

According to the present invention, the correction value for correcting at least one of the targeted temperature (preset temperature) and the detected temperature (inputted temperature) is calculated based on the difference between the temperature of the heat-treatment object and the temperature of the desired temperature profile. Accordingly, the targeted temperature and the detected temperature can be corrected based on the calculated correction value without the adjustment of the targeted temperature (preset temperature) and the like in a trial-and-error approach as in the conventional technology.

According to a second aspect of the present invention, a temperature control method is provided, wherein the temperature of the object to be heat-treated is preferably obtained from temperatures measured at a plurality of measuring points where the temperature is measured while the heat-treatment object is moved in the plurality of heat-treatment zones.

The measuring point refers to a point at which the temperature of the heat-treatment object is planned to be measured in the plurality of heat-treatment zones. Preferably, a point at which the temperature of the object to be heat-treated most closely corresponds to the temperature of the desired temperature profile is selected as the measuring point.

According to this second aspect of the invention, the correction value is preferably calculated based on the difference between the temperature of the heat-treatment object measured at each of the plurality of measuring points and the temperature of the desired temperature profile. As a result, the targeted temperature and the detected temperature can be accurately corrected in comparison to the correction using the initial temperature of the object to be heat-treated or the like.

According to a third aspect of the present invention, a temperature control method is provided which comprises a first step for applying the heat treatment by moving the object to be heat-treated in the plurality of heat-treatment zones and measuring the temperature of the object to be heat-treated, a second step for obtaining a degree of interference between the heat-treatment zones at each of the plurality of measuring points of the object to be heat-treated when the targeted temperature is changed based on the measured temperature of the object to be heat-treated, and a third step for calculating the correction value based on the obtained degree of interference.

The degree of interference refers to the amount of change in heating due to the interference between the heat-treatment zones to which the object to be heated at each measuring point is subjected when the targeted temperature of each of the heat-treatment zones is changed. More specifically, it is the heating change the object undergoes due to the interference between heat-treatment zones when the targeted temperature of one of the heat-treatment zones is changed.

The degree of influence may be obtained from actual measurements, and is preferably estimated based on a model including the heat-treatment zones and the heat-treatment object.

According to the present embodiment, when the targeted temperature is changed, the degree of influence that the heated object experiences at each measuring point, that is the variation of the temperature of the heated object at the respective measuring points relative to a variation of the targeted temperature, is previously obtained as the degree of interference. Therefore, how the targeted temperature should be changed in order to change the temperature of the heated object at each measuring point to correspond to the desired temperature profile can be obtained in the form of the correction value based on the degree of interference. As a result, when the targeted temperature and the detected temperature are corrected based on the correction value, the targeted temperature and the detected temperature can be more easily adjusted and the desired temperature profile can be more accurately achieved.

According to a fourth aspect of the present invention, a temperature control method may further include a fourth step for correcting at least one of the targeted temperature and the detected temperature based on the calculated correction value.

According to this fourth aspect, at least one of the targeted temperature and the corrected temperature may be automatically adjusted based on the calculated correction value.

According to a fifth aspect of the present invention, a matrix showing a relation between the variation of a targeted temperature and a temperature variation of the heat-treatment object at a plurality of measuring points may be obtained based on the measured temperature of the heat-treatment object, and a correction value may be calculated by means of an inverse matrix of the matrix.

According to this aspect of the present invention, the correction value may be obtained by means of the inverse matrix of the matrix showing the relation between the variation of the targeted temperature and the temperature variation of the heated object at the plurality of measuring points. Accordingly, the targeted temperature and the detected temperature can be corrected based on the correction value without the adjustment of the targeted temperature in the trial-and-error approach as in the conventional technology.

According to a sixth aspect of the present invention, a model including the heat-treatment zones and the heat-treatment object may be generated based on the targeted temperature of each of the heat-treatment zones and the measured temperature of the heated object so that the matrix can be obtained by means of the generated model.

According to this aspect of the present invention, the matrix showing the relation between the variation of the targeted temperature and the temperature variation of the heated object at the plurality of measuring points is obtained by means of the model including the heat-treatment zones and the heated object. As a result, it becomes unnecessary to measure the temperature variation of the heated object at the plurality of measuring points by actually changing the targeted temperatures of the respective heat-treatment zones.

According to a seventh aspect of the present invention, a temperature control apparatus is provided comprising a temperature adjusting device for controlling temperatures of a plurality of continuous heat-treatment zones in a heat treatment applied to an object while the object is moved in the plurality of heat-treatment zones and a correcting device for calculating a correction value based on a difference between a temperature of the heated object and a temperature of a desired temperature profile, wherein the temperature adjusting device controls the temperatures of the respective heat-treatment zones based on a targeted temperature and a detected temperature of each of the heat-treatment zones and corrects at least one of the targeted temperature and the detected temperature based on the correction value.

The correcting device preferably comprises an PLC (programmable logic controller) and a computer.

According to the present invention, the correction value for correcting at least one of the targeted temperature and the detected temperature is calculated based on the difference between the measured temperature of the heated object and the temperature of the desired temperature profile. Therefore, it becomes unnecessary to adjust the targeted temperature and the like in the trial-and-error approach as in the conventional technology, and the targeted temperature and the detected temperature can be corrected based on the calculated correction value.

According to an eighth aspect of the present invention, a temperature control apparatus is provided wherein, the temperature of the heated object is preferably the temperature of the heated object measured at each of the plurality of measuring points while the object is moved in the plurality of heat-treatment zones.

According to this aspect, the correction value is calculated based on the difference between the temperature of the object to be heat-treated measured at each of the plurality of measuring points while the object is moved in the plurality of heat-treatment zones and the temperature of the desired temperature profile. Therefore, the correction in the foregoing manner can be more accurate than in a case where an initial temperature of the heat-treatment object is used.

Further in accordance with this aspect, the correcting device may calculate the correction value based on a degree of interference between the heat-treatment zones at each of the plurality of measuring points of the heat-treatment object when the targeted temperature is changed.

According to the present embodiment, the correction value for correcting the targeted temperature and the detected temperature can be obtained based on the degree of interference, which facilitates the adjustment operation for correcting the targeted temperature and the detected temperature in the application of the heat treatment based on the desired temperature profile.

In accordance with a ninth aspect of the present invention, a correcting device may obtain a matrix showing a relation between a variation of the targeted temperature and a temperature variation of the heat-treatment object at the plurality of measuring points based on the measured temperatures of the heat-treatment object while the heated object is moved in the plurality of heat-treatment zones and calculates the correction value using an inverse matrix of the matrix.

According to this aspect, the correction value is obtained by means of the inverse matrix of the matrix showing the relation between the variation of the targeted temperature and the temperature variation of the heat-treatment object at the plurality of measuring points. Therefore, when the targeted temperature and the detected temperature are corrected based on the correction value, it becomes unnecessary for an operator to make adjustments in the trial-and-error approach.

In accordance with a tenth aspect of the present invention, the correcting device may comprise a model including the heat-treatment zones and the object to be heat-treated obtained based on the targeted temperature of each of the heat-treatment zones and the measured temperature of the object to be heat-treated, wherein the matrix is obtained by means of the model.

According to this aspect of the invention, the model including the heat-treatment zones and the object to be heat-treated is used to obtain the matrix. Therefore, it becomes unnecessary to measure the temperature variation of the heat-treatment object at the plurality of measuring points by actually changing the targeted temperature of each of the heat-treatment zones.

According to a further aspect of the present invention, a heat treatment apparatus according to the present invention may comprise a temperature control apparatus as described above, and a continuous processing device comprising a plurality of continuous heat-treatment zones and subjected to a temperature control by the temperature control apparatus.

In accordance with this aspect of the invention, the continuous processing device may comprise a plurality of continuous heat-treatment zones, examples of which are a reflow furnace and a continuous baking furnace.

The present invention facilitates the adjustment operation for correcting the targeted temperature and the detected temperature for heat-treating the heat-treatment object at a desired temperature.

In accordance with a further aspect of the present invention, a program may be used for controlling temperatures of a plurality of continuous heat-treatment zones in a heat treatment applied while an object is moved in the heat-treatment zones. In accordance with this aspect, such a computer program may include the following steps: a first step for inputting a temperature data of the object to be heat-treated measured in the heat treatment applied while the heated object is moved in the plurality of heat-treatment zones; a second step for obtaining a degree of interference between the heat-treatment zones at a plurality of measuring points of the heat-treatment object when a targeted temperature of each of the heat-treatment zones is changed based on the inputted temperature data of the heated object, and a third step for calculating a correction value for correcting at least one of the targeted temperature and a detected temperature of each of the heat-treatment zones based on the degree of interference and a difference between a temperature of the heated object and a temperature of a desired temperature profile.

According to the present invention, the program is executed by the computer so that the correction value for correcting the targeted temperature and the detected temperature can be obtained based on the previously measured degree of interference. Therefore, the adjustment operation for correcting the targeted temperature and the detected temperature for heat-treating the object to be heat-treated at a desired temperature is facilitated.

The program according to the present invention may be recorded on a computer-readable recording medium such as a flexible disk, a hard disk, an optical disk, a magnetic optical disk, CD-ROM, a magnetic tape, a non-volatile memory card and ROM.

As described so far, according to the present invention, the correction value, for correcting at least one of the targeted temperature and the detected temperature, is calculated based on the difference between the measured temperature of the heat-treatment object and the temperature of the desired temperature profile. Thereafter, the targeted temperature and the detected temperature can be corrected based on the calculated correction value without the adjustment of the targeted temperature and the like in the trial-and-error approach as in the conventional technology. As a result, the adjustment operation can be facilitated.

DETAILED DESCRIPTION OF THE INVENTION

Figure 1:
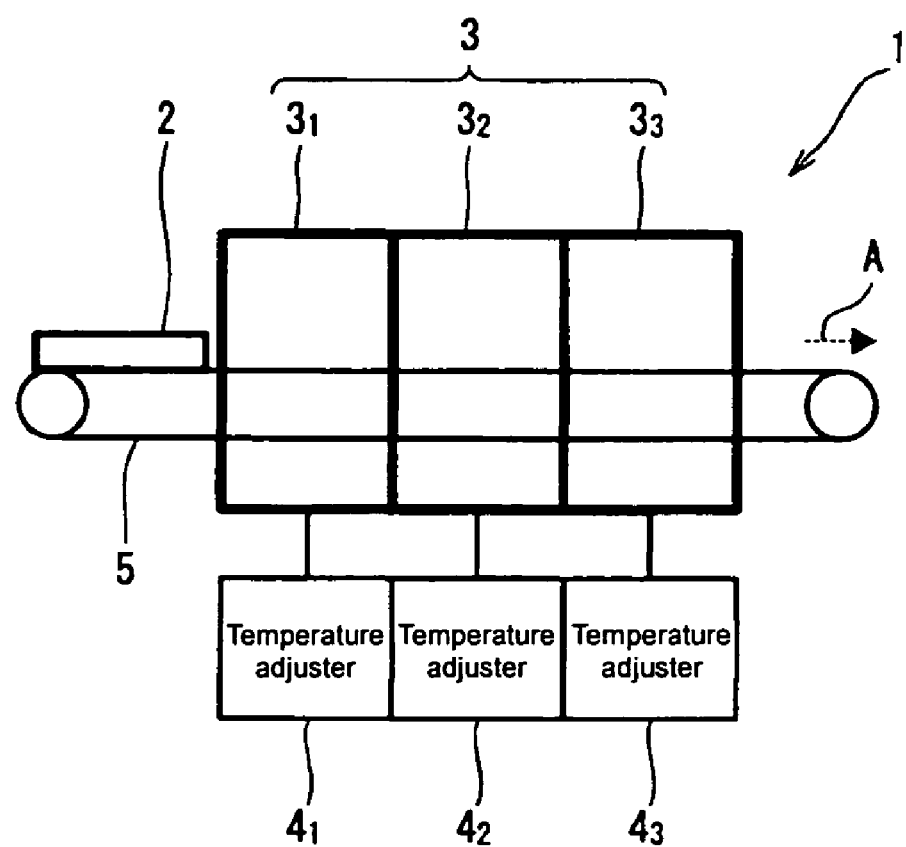
FIG. 1 shows a schematic constitution of a heat treatment apparatus according to an embodiment of the present invention.

Hereinafter, preferred embodiments of the present invention are described in detail referring to the drawings.

FIG. 1 shows a schematic constitution of a heat treatment apparatus comprising a temperature adjusting device according to an embodiment of the present invention.

A heat treatment apparatus 1 according to the embodiment applies a heat treatment to a glass substrate 2 as an object to be heat-treated in a continuous furnace 3. The continuous furnace 3 comprises first through third furnaces $3_1$-$3_3$ constituting a plurality of heat-treatment zones continuous in the horizontal direction. The first through third furnaces $3_1$-$3_3$ are respectively provided with a temperature sensor and a heater not shown. Outputs of the temperature sensors are applied to temperature adjusting devices $4_1$-$4_3$ respectively corresponding to the furnaces $3_1$-$3_3$. The temperature adjusting devices $4_1$-$4_3$ control the conduction of the heaters of the furnaces $3_1$-$3_3$.

The temperature adjusting devices $4_1$-$4_3$ control the conduction of the heaters respectively provided in the furnaces $3_1$-$3_3$ based on a difference between preset temperatures (targeted temperatures) of the respective furnaces $3_1$-$3_3$ set by an upper device or a setting device, not shown, and detected temperatures of the respective furnaces $3_1$-$3_3$ by the temperature sensors.

The glass substrate 2 subjected to the heat treatment in the continuous furnace 3 is conveyed in the continuous furnace 3 by a belt conveyer 5 at a constant speed in a direction shown by an arrow A to be heat-treated.

In the foregoing heat treatment of the glass substrate 2, it is necessary to control the temperatures of the furnaces $3_1$-$3_3$ so that a temperature profile representing how a temperature of the glass substrate 2 conveyed and moved in the continuous furnace 3 changes over time corresponds to a desired temperature profile. Accordingly, it becomes necessary to adjust the preset temperatures of the temperature adjusting devices $4_1$-$4_3$ respectively corresponding to the furnaces $3_1$-$3_3$.

According to the present embodiment, the following process is adopted so that the adjustment of the preset temperatures can be facilitated instead of a conventional trial-and-error approach which depends on an experience and a technical intuition of an operator.

In a temperature control method according to the present embodiment, first, a degree of interference on how the temperature of the glass substrate 2 is changed at a plurality of measuring points in the continuous furnace 3 when the glass substrate 2 is conveyed and moved in the continuous furnace 3 at the constant speed to be heat-treated in a state where the preset temperatures of the respective furnaces $3_1$-$3_3$ are changed and reset is obtained in advance.

The measuring point refers to a position of the glass substrate 2 at which the temperature in the continuous furnace 3 is planned to be measured, which consequently corresponds to a time point when the temperature is planned to be measured in the temperature profile representing the temperature variation of the glass substrate 2 over time.

A time point when it is highly necessary for the temperature of the glass substrate 2 to correspond to the temperature of the desired temperature profile is preferably selected as the measuring point. For example, as described later, a measuring point during a period when the glass substrate 2 passes through the first furnace $3_1$, a measuring point during a period when the glass substrates 2 passes through the second furnace $3_2$, and a measuring point during a period when the glass substrate 2 passes through the third $3_3$, which are three measuring points in total, may be selected.

The degree of interference refers to a degree of influence that the temperature of the glass substrate at each of the plurality of measuring points in the furnace 3 undergoes due to a thermal interference among the furnaces $3_1$-$3_3$ when the preset temperatures of the furnaces $3_1$-$3_3$ are changed.

Next, correction values for the preset temperatures of the furnaces $3_1$-$3_3$ are calculated so that the temperatures of the glass substrate 2 at the plurality of measuring points correspond to the temperatures at the corresponding measuring points in the desired temperature profile based on the degree of interference obtained in advance.

More specifically, how the preset temperatures of the furnaces $3_1$-$3_3$ should be changed so that the temperatures of the glass substrate 2 at the plurality of measuring points correspond to the temperatures of the desired temperature profile is calculated in the form of the correction value based on the degree of interference showing the temperature variation of the glass substrate 2 at the plurality of measuring points relative to the variation of the preset temperatures of the furnaces $3_1$$3_3$.

More specifically, in order to obtain the degree of interference, the temperature profile may be obtained in such manner that, first, the glass substrate 2 is run in the continuous furnace 3 so as to measure the temperature profile in a state where the preset temperature of the first furnace $3_1$ is actually changed and reset, next, the glass substrate 2 is run in the continuous furnace 3 so as to measure the temperature profile in a state where the preset temperature of the second furnace $3_2$ is actually changed and reset, and then, the glass substrate 2 is run in the continuous furnace 3 so as to measure the temperature profile in a state where the preset temperature of the third furnace $3_3$ is actually changed and reset.

However, if the continuous furnace 3 has a long dimension and comprises a large number of furnaces constituting the continuous furnace 3, a large number of processing steps is required, which is not practical.

Therefore, in the present embodiment, a system including the continuous furnace 3 and the glass substrate 2 as the object to be heat-treated is subjected to a modeling process, and a model of the system thereby obtained is used to as to obtain the degree of interference.

Figure 2:
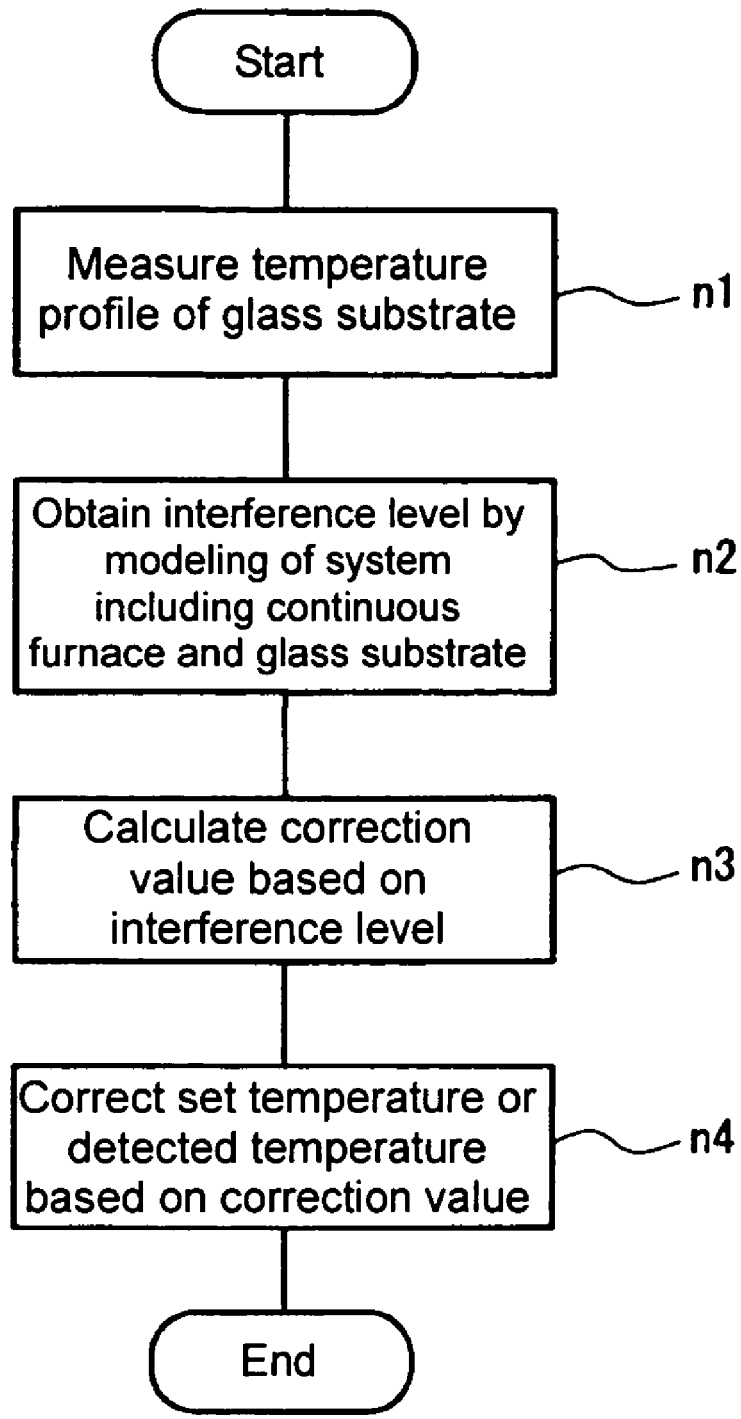
FIG. 2 shows a flow chart illustrating a temperature control method according to the present invention.

More specifically, according to the present embodiment, as shown in FIG. 2, a test glass substrate 2 provided with a temperature sensor is moved in the continuous furnace 3 at a constant speed to be heat-treated in the same manner as in the actual operation so that the temperature profile is measured (step n1), the system including the continuous furnace 3 and the glass substrate 2 is modeled based on the temperature profile of the glass substrate 2, and the model of the system thereby obtained is used to obtain the degree of interference on how the temperature of the glass substrate 2 is changed at the plurality of measuring points in the continuous furnace 3 when the preset temperatures of the furnaces $3_1$-$3_3$ are changed (step n2).

Next, based on the obtained degree of interference, a correction value for correcting at least one of the preset temperature and the detected temperature is calculated so that the temperature of the glass substrate 2 corresponds to the temperature of the desired temperature profile at each of the plurality of measuring points (step n3). Then, at least one of the preset temperature and the detected temperature is corrected based on the calculated correction value in the actual operation (step n4).

Figure 3:
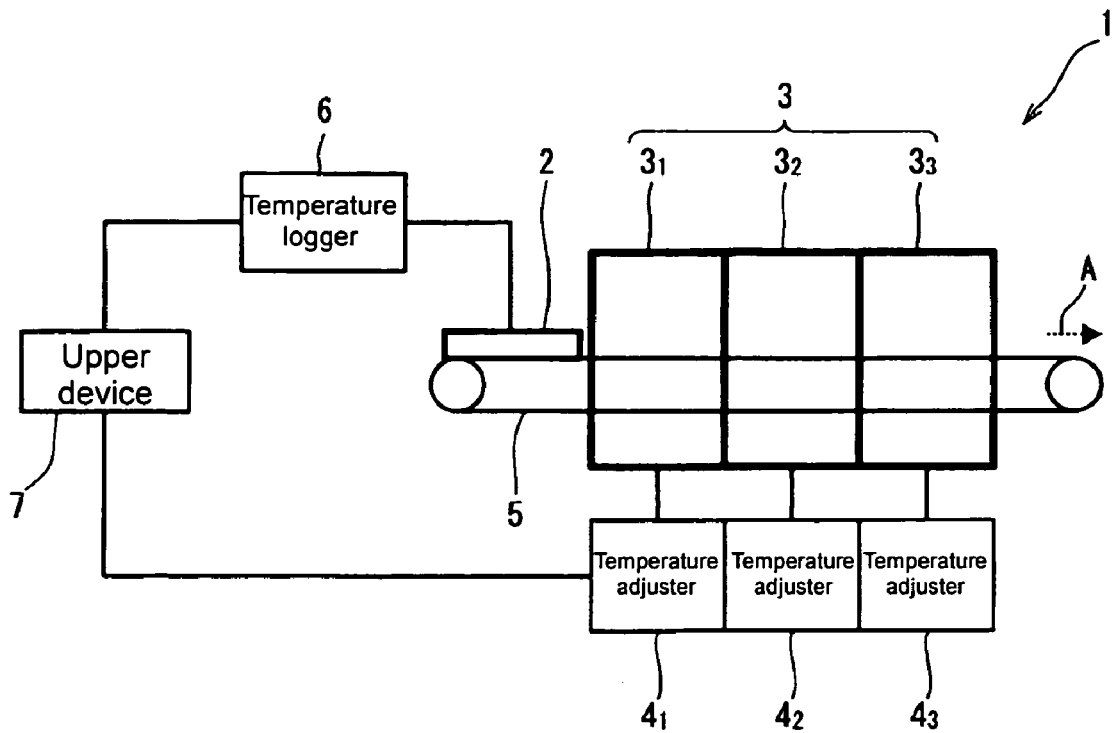
FIG. 3 shows a schematic illustration of the measurement of a temperature profile.

FIG. 3 shows an exemplary schematic constitution of the heat treatment apparatus for calculating the correction value by measuring the degree of interference, wherein any component corresponding to FIG. 1 is denoted by the same reference numeral. Referring to reference numerals shown in FIG. 3, 2 denote a test glass substrate provided with a temperature sensor, 6 denotes a temperature logger for measuring the temperature of the test glass substrate 2, and 7 denotes an upper device as a correction device for an PLC (programmable logic controller) and a personal computer which is connected to the temperature logger 6 and the temperature adjusting devices $4_1$-$4_3$. The upper device 7 can change the preset temperatures of the respective temperature adjusting devices $4_1$-$4_3$ through the communication with the temperature logger 6 and the temperature adjusting devices $4_1$-$4_3$ and measure the temperature of the glass substrate 2. The upper device 7 and the temperature adjusting devices $4_1$-$4_3$ constitute the temperature control apparatus according to the present invention.

According to the present embodiment, the upper device 7 comprises a microcomputer, and executes a program according to the present invention stored in a ROM of the microcomputer to thereby model the system including the continuous furnace 3 and the glass substrate 2. The upper device 7 then obtains the degree of interference using the model, calculates the correction values based on the degree of interference as described later, and sets and stores the calculated correction values respectively in the temperature adjusting devices $4_1$-$4_3$.

According to the present embodiment, the system is modeled in such manner that the degree of influence to which the temperature of the glass substrate 2 is subjected at each of the plurality of measuring points in the continuous furnace 3 due to the interference among the furnaces $3_1$-$3_3$ generated when the preset temperatures of the respective furnaces $3_1$-$3_3$ are changed can be estimated by means of the model of the system including the continuous furnace 3 and the glass substrate 2.

In order to perform the modeling described above, the test glass substrate 2 provided with the temperature sensor is moved in the continuous furnace 3 at a constant speed to be heat-treated in the same manner as in the actual operation so that the temperature profile is measured. More specifically, the test glass substrate 2 is moved in the continuous furnace 3 at the constant speed to be heat-treated in a state where the temperatures of the respective furnaces $3_1$-$3_3$ are controlled to set to a certain temperature so that the temperature profile is measured, for example, as shown in FIG. 4.

Figure 4:
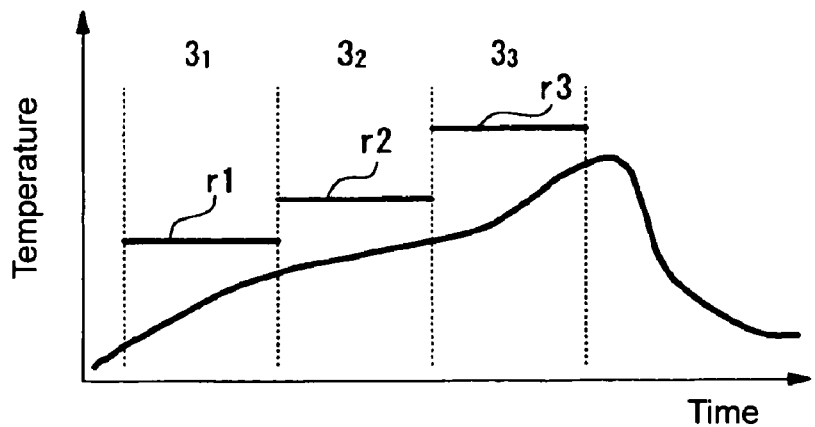
FIG. 4 shows the temperature profile.

In FIG. 4, reference symbols r1-r3 denote the preset temperatures of the respective furnaces $3_1$-$3_3$. The preset temperatures r1-r3 of the respective furnaces $3_1$-$3_3$ are preferably set so that a temperature profile relatively approximate to the desired temperature profile is obtained, however, may be arbitrarily set.

Figure 5:
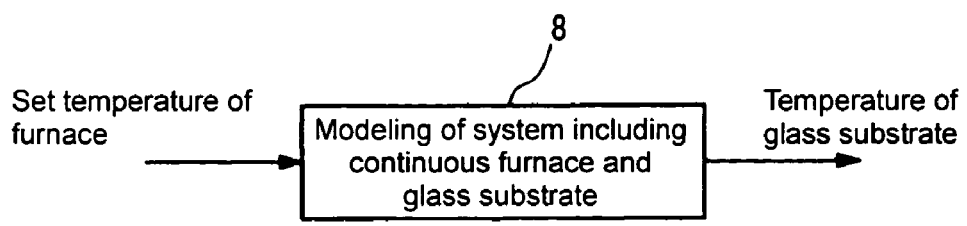
FIG. 5 shows an illustration of a glass substrate modeling.

Next, data of the temperature profile and data of the preset temperatures of the respective furnaces $3_1$-$3_3$ are used so as to generate a model 8 of the system including the continuous furnace 3 and the glass substrate 2 as shown in FIG. 5.

As the model 8 is used an ARX model expressed by the following expression, and parameters α and β are obtained by means of the least squares method.

$$\alpha(q)y(k)=\beta(q)u(k)$$

provided that α, β: model parameters
q: shift operator
u(k): chronological data of furnace preset temperature
y(k): chronological data of glass substrate temperature
k: 0, 1, 2, 3, . . .

A sampling period is, for example, 0.5 seconds.

The chronological data u(k) of the preset temperatures of the furnaces constantly stays at the preset temperatures of the respective furnaces $3_1$-$3_3$ during the periods when the glass substrate 2 passes through the respective furnaces $3_1$-$3_3$. For example, the chronological data u(k) of the preset temperatures of the furnaces during the period when the glass substrate 2 passes through the first furnace $3_1$ stays at the preset temperature r1 of the first furnace $3_1$.

Thus, the parameters α and β are estimated from the chronological data u(k) of the preset temperatures of the furnaces as the input data and the chronological data y(k) of the temperatures of the glass substrate as the output data by means of the least squares method, and the model 8 is thereby generated.

When the model 8 of the system is used, the temperature of the glass substrate 2 at each of the plurality of measuring points in the continuous furnace 3 can be estimated based on the preset temperatures of the respective furnaces $3_1$-$3_3$.

According to the present embodiment, the degree of influence that the temperature of the glass substrate 2 at each of the plurality of measuring points in the continuous furnace 3 undergoes when the preset temperatures of the respective furnaces $3_1$-$3_3$ are changed, that is the degree of interference, is obtained as follows.

Figure 6:
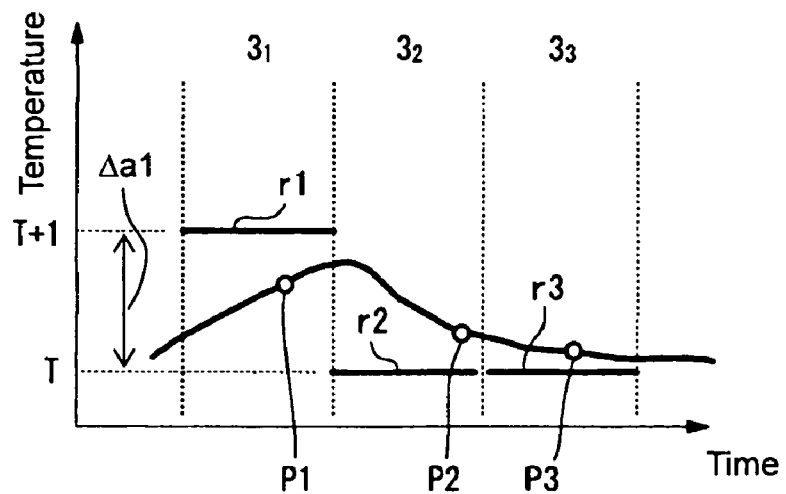
FIG. 6 respectively show the temperature profile and measuring points.
Figure 6:
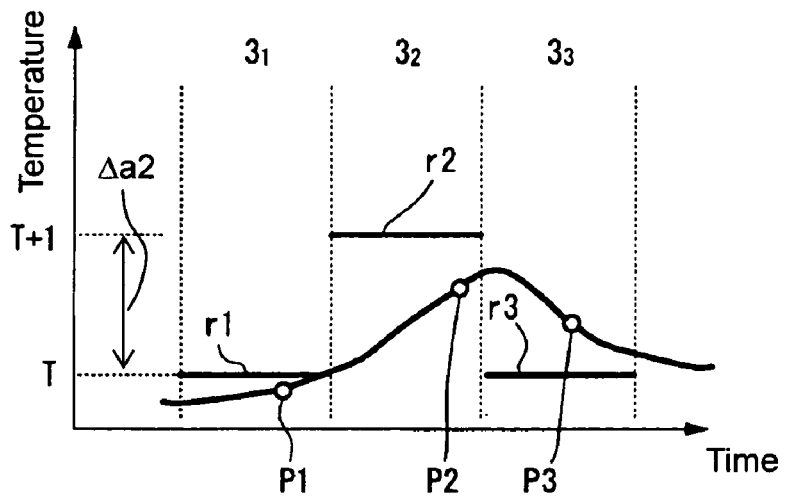
Figure 6:
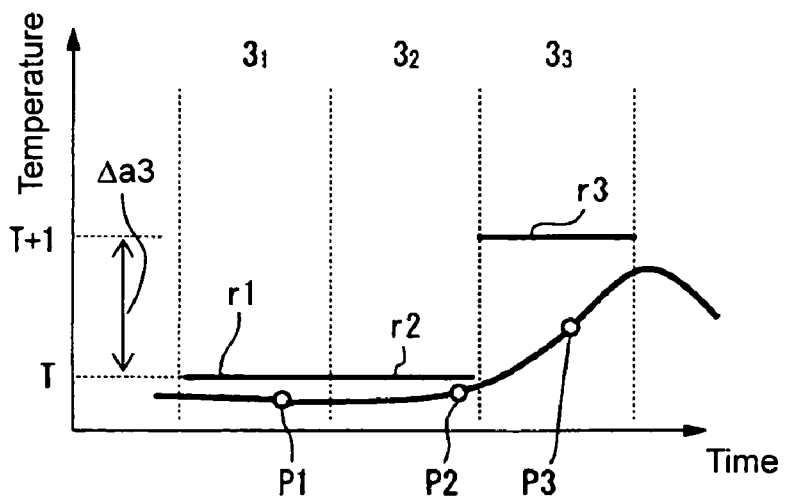

The temperatures of the glass substrate 2 at the plurality of measuring points given that the preset temperatures r1-r3 of the respective furnaces $3_1$-$3_3$ are reset to T° C. and the glass substrate 2 is moved in the continuous furnace 3 at a constant speed, for example, the temperatures of the glass substrate 2 at first through third measuring points P1-P3 shown in FIG. 6, are previously estimated based on the model 8.

Next, as shown in FIG. 6A, the temperatures of the glass substrate 2 at the first through third measuring points P1-P3 given that the preset temperature r1 of the first furnace $3_1$ is changed from T° C. by Δa1, for example, by 1 (C, the preset temperatures r2 and r3 of the second and third furnaces 32 and 33 are respectively reset to T (C, and the glass substrate 2 is moved in the continuous furnace 3 are estimated based on the model 8. Then, temperature variations c11, c12 and c13 in comparison to the temperatures of the glass substrate 2 at the first through third measuring points P1-P3 previously estimated prior to the change of the preset temperature r1 are estimated.

In the same manner, as shown in FIG. 6B, the temperatures of the glass substrate 2 at the first through third measuring points P1-P3 given that the preset temperature r2 of the second furnace 32 is changed from T (C by Δa2, for example, by 1 (C, the preset temperatures r1 and r3 of the first and third furnaces 31 and 33 are respectively reset to T (C, and the glass substrate 2 is moved in the continuous furnace 3 are estimated based on the model 8. Then, temperature variations c21, c22 and c23 in comparison to the temperatures of the glass substrate 2 at the first through third measuring points P1-P3 previously estimated prior to the change of the preset temperature r2 are estimated.

Further, as shown in FIG. 6 (c), the temperatures of the glass substrate 2 at the first through third measuring points P1-P3 given that the preset temperature r3 of the first furnace $3_3$ is changed from T° C. by Δa3, for example, by 1° C., the preset temperatures r1 and r2 of the first and second furnaces $3_1$ and $3_2$ are respectively set to T° C., and the glass substrate 2 is moved in the continuous furnace 3 are estimated based on the model 8. Then, temperature variations c31, c32 and c33 in comparison to the temperatures of the glass substrate 2 at the first through third measuring points P1-P3 previously estimated prior to the change of the preset temperature r3 are estimated.

When the preset temperatures r1-r3 of the respective furnaces $3_1$-$3_3$ are thus changed, the following matrix showing the temperature variation of the glass substrate 2 at the first through third measuring points P1-P3 in the continuous furnace 3, that is the degree of interference, due to the interference generated among the respective furnaces $3_1$-$3_3$ can be obtained.

$$\begin{bmatrix} c_{11} & c_{21} & c_{31} \\ c_{12} & c_{22} & c_{32} \\ c_{13} & c_{23} & c_{33} \end{bmatrix} \quad \text{[Numeric Expression 1]}$$

Then, when the variations of the preset temperatures r1-r3 of the respective furnaces $3_1$-$3_3$ in the continuous furnace 3 are denoted by Δa1-Δa3, and the variations of the temperatures of the glass substrate 2 at the first through third measuring points P1-P3 are denoted by Δb1-Δb3, the following relational expression is realized.

$$\begin{bmatrix} \Delta b_1 \\ \Delta b_2 \\ \Delta b_3 \end{bmatrix} = \begin{bmatrix} c_{11} & c_{21} & c_{31} \\ c_{12} & c_{22} & c_{32} \\ c_{13} & c_{23} & c_{33} \end{bmatrix} \begin{bmatrix} \Delta a_1 \\ \Delta a_2 \\ \Delta a_3 \end{bmatrix} \quad \text{[Numeric Expression 2]}$$

Next is described the correction of the preset temperatures r1-r3 of the respective furnaces $3_1$-$3_3$ in order to heat-treat the glass substrate 2 so that the temperature thereof corresponds to the temperature of the desired temperature profile using the matrix showing the degree of interference thus obtained.

Figure 7:
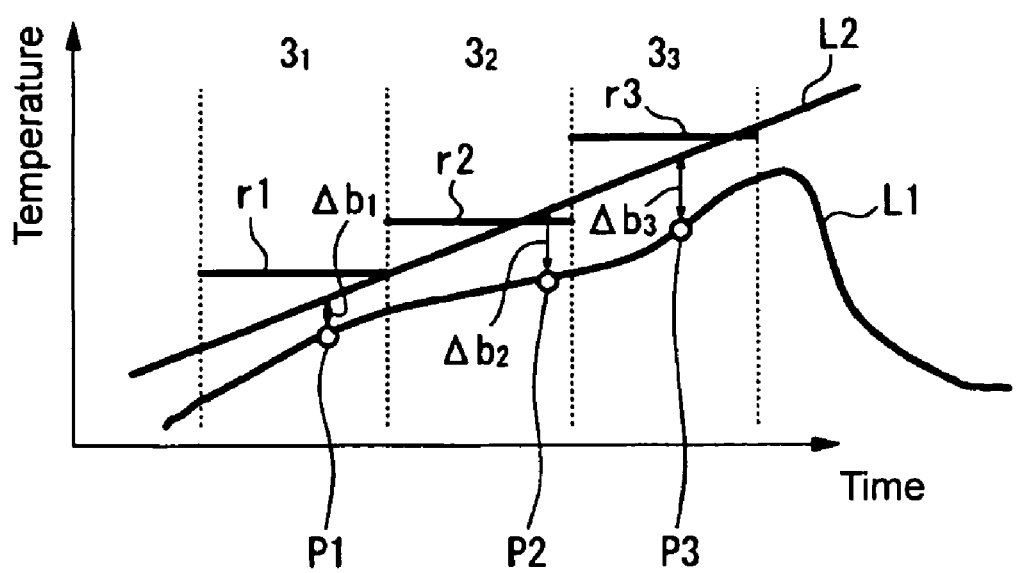
FIG. 7 shows the measured temperature profile and a desired temperature profile.

First, the preset temperatures r1-r3 of the respective furnaces $3_1$-$3_3$ are set, and the test glass substrate 2 is moved in the continuous furnace 3 to be heat-treated so that a temperature profile L1 is measured as shown in FIG. 7. The preset temperatures r1-r3 of the respective furnaces $3_1$-$3_3$ are preferably set so that the temperature profile relatively approximate to the desired temperature profile is obtained, however, may be arbitrarily set.

Then, provided that respective differences between the measured temperatures of the obtained temperature profile L1 at the first through third measuring points P1-P3 and corresponding temperatures of a desired temperature profile L2 are Δb1-Δb3, the correction values Δa1-Δa3 for the preset temperatures r1-r3 of the respective furnaces $3_1$-$3_3$ or the detected temperatures (inputted temperatures) of the respective furnaces $3_1$-$3_3$ inputted to the temperature adjusting devices $4_1$-$4_3$ should be obtained in such manner that the temperature differences Δb1-Δb3 can be reduced.

As the temperature profile L1 may be used the temperature profile shown in FIG. 4, which is previously measured in order to model the system including the continuous furnace 3 and the glass substrate 2.

The correction values Δa1-Δa3 can be calculated in the following expression by means of an inverse matrix of the matrix representing the degree of interference.

$$\begin{bmatrix} \Delta a_1 \\ \Delta a_2 \\ \Delta a_3 \end{bmatrix} = \begin{bmatrix} c_{11} & c_{21} & c_{31} \\ c_{12} & c_{22} & c_{32} \\ c_{13} & c_{23} & c_{33} \end{bmatrix}^{-1} \begin{bmatrix} \Delta b_1 \\ \Delta b_2 \\ \Delta b_3 \end{bmatrix}$$ [Numeric Expression 3]

When the foregoing expression 3 is worked out, the correction value, which was conventionally adjusted in the trial-and-error approach, can be easily calculated.

Alternatively, the calculated correction values are added to the preset temperatures r1-r3 of the respective furnaces $3_1$-$3_3$ or the detected temperatures of the respective furnaces $3_1$-$3_3$ inputted to the temperature adjusting devices $4_1$-$4_3$ for the correction. As a result, the values of the temperature differences in comparison to the temperatures of the desired temperature profile can be inversely calculated by means of the matrix.

The number of the measuring points is three in the foregoing description, however, is not limited to the number and may be arbitrarily determined.

The correction values thus calculated in the upper device 7 are respectively transmitted to the corresponding temperature adjusting devices $4_1$-$4_3$ and set therein.

Therefore, the adjustment operation for correcting the preset temperatures or the detected temperatures no longer depends on the experience of the operator and demands the trial-and-error approach and can be automated.

The operator may correct the preset temperatures or the detected temperatures (inputted temperatures) of the temperature adjusting devices $4_1$-$4_3$ based on the correction values calculated in the upper device 7.

Figure 8:
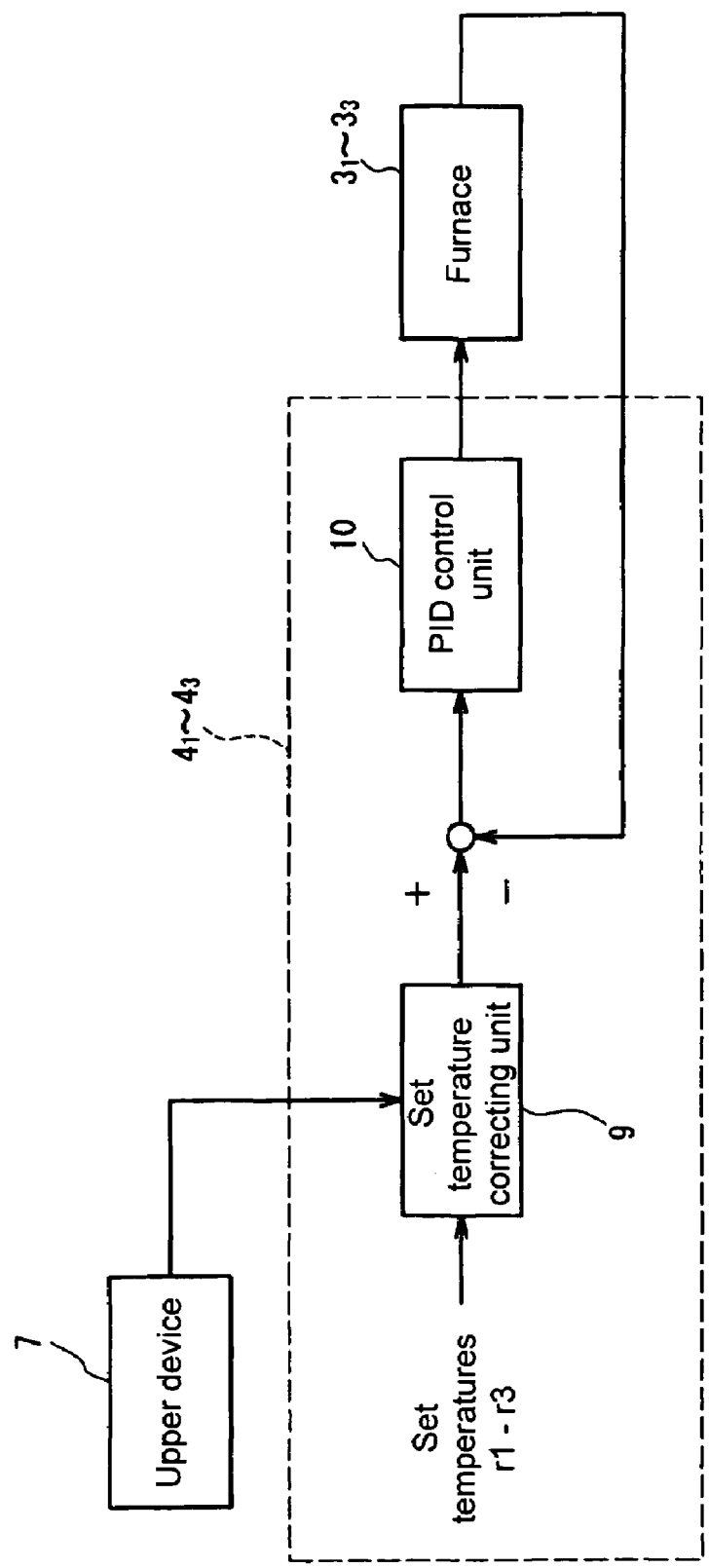
FIG. 8 shows a block diagram of a temperature adjusting device.

FIG. 8 shows a block diagram of the temperature adjusting devices $4_1$-$4_3$ according to the present embodiment.

The temperature adjusting devices $4_1$-$4_3$ respectively comprise a preset temperature correcting section 9 for correcting the preset temperature. The preset temperature correcting sections 9 store therein the respective correction values calculated in the upper device 7 as described, and add the correction values to the preset temperatures r1-r3 and output a result of the addition.

Therefore, a PID operation is executed in each PID control section 10 so as to output a manipulated variable MV based on the respective differences between the detected temperatures and the preset temperatures to which the correction values are added. Then, the conduction of the heaters provided in the respective furnaces $3_1$-$3_3$ is controlled so that the glass substrate 2 is heat-treated at the temperatures of the temperature profile.

The preset temperature correcting section 9 and the PID control section 10 comprises, for example a microcomputer.

Figure 9:
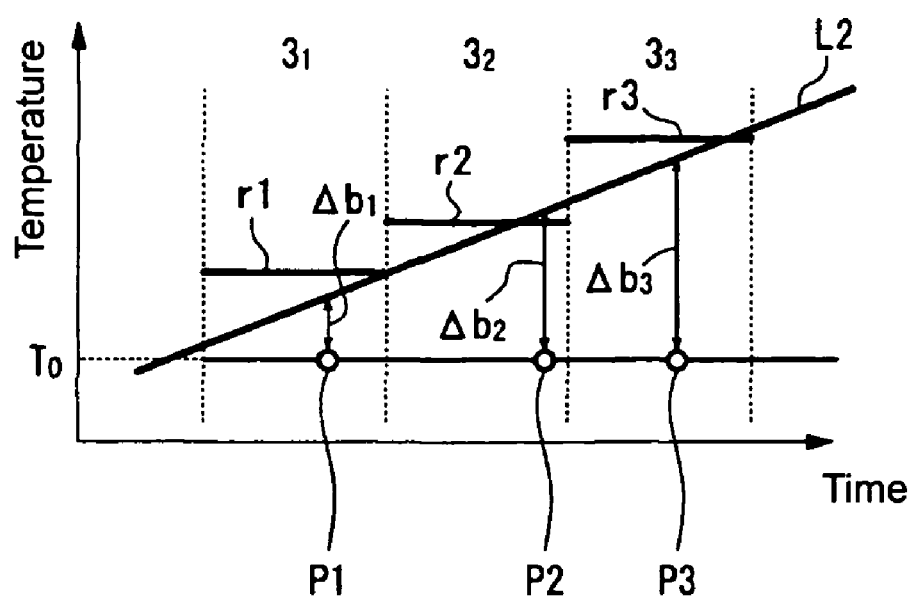
FIG. 9 shows the measured temperature profile and a desired temperature profile according to another embodiment of the present invention corresponding to FIG. 7.

In the foregoing embodiment, as shown in FIG. 7, the temperature differences between the temperatures of the temperature profile L1 measured at the first through third measuring points P1-P3 and the corresponding temperatures of the desired temperature profile L2 are denoted by Δb1-Δb3. In another embodiment, though the accuracy of the correction is slightly lessened, differences between an initial temperature T0 of the glass substrate 2 prior to the heat treatment, for example 30 (C, and the corresponding temperatures of the desired temperature profile L2 at the measuring points P1-P3 may be denoted by Δb1-Δb3 as shown in FIG. 9.

In the foregoing embodiment, the glass substrate is provided with one temperature sensor in order to measure the temperature at only one point of the glass substrate, however, temperatures at a plurality of points in a surface of the glass substrate may be measured. For example, when the temperatures at three points in the surface of the glass substrate are measured, the number of the temperature profiles and the models are three in response to the number of the measuring points. In that case, when the measurement at each of the three points in the surface of the glass substrate is implemented, for example, at the respective measuring points P1-P3, the temperature is consequently measured at 3 (3=9 measuring points. Thus, the number of the measuring points is increased in comparison to the three points at which the temperature of the continuous furnace comprising three furnaces can be set. As a result, the matrix of 3 (3 representing the degree of interference is increased to the matrix of 9 (3, which makes it difficult to obtain an inverse matrix thereof. In order to deal with the problem, a pseudo inverse matrix can be obtained in place of the inverse matrix.

In the foregoing embodiment, the glass substrate is moved in the continuous furnace at the constant speed to be heat-treated, however, the speed at which the glass substrate is moved in the continuous furnace may be changed for the heat treatment. In such a case, the speed of the movement of the glass substrate is changed or the measurement in the same manner as in the heat treatment when the chronological data relating to the temperature of the glass substrate for the modeling is measured.

The number of the heat-treatment zones is three in the description of the foregoing embodiment, however, it is needless to say that it is not limited to three.

The glass substrate is subjected to the heat treatment in the description of the foregoing embodiment, however, the heat treatment may be applied to a semiconductor substrate or some other object.

The heater is used in the heat treatment in the description of the foregoing embodiment, however, a cooling treatment, in which a Peltier element or a cooling device is used, is applicable. Further, a temperature control operation, in which the heating and cooling treatments are combined, is also applicable.

The heat-treatment zone may be controlled in its airflow and the like in addition to its temperature.

The present invention is effectively applied to a temperature control apparatus and a heat treatment apparatus. Although the invention is described herein with reference to preferred aspects and embodiments, one skilled in the art will readily appreciate that other applications may be substituted for those set forth herein without departing from the spirit and scope of the present invention. For example, the invention is discussed primarily with respect to heating glass substrates. However, alternative substrates and heated objects may also be used with the present invention. Likewise, a horizontal and continuous method of heating an object is provided according to selected preferred embodiments. Alternatively, non-horizontal and non-continuous methods of heating an object may also benefit from use with the controls of the present invention. Accordingly, the invention should only be limited by the claims included below.

What is claimed is:

1. A temperature control method for controlling temperatures of a plurality of heat-treatment zones in a heat treatment applied to an object to be heat-treated while the object is moved in the plurality of heat-treatment zones, comprising:
   calculating a correction value based on a difference between a measured temperature of the object and a temperature of a desired temperature profile of the object, the correction value for correcting at least one of a targeted temperature and a detected temperature of each of the heat-treatment zones;
   controlling the temperatures of the respective heat-treatment zones based on the targeted temperature and the detected temperature of each of the heat-treatment zones,
   wherein the measured temperature of the object to be heat-treated is a temperature measured at at least one of a plurality of measuring points while the object is moved in the plurality of heat-treatment zones;
   applying the heat treatment by moving the object to be heat-treated in the plurality of heat-treatment zones and measuring the temperature of the object;
   obtaining a degree of interference between the heat-treatment zones at at least one of the plurality of measuring points of the object when the targeted temperature is changed based on the measured temperature of the object, the degree of interference being the degree of influence that the temperature of the object at each of the plurality of measuring points undergoes due to a thermal interference between the heat-treatment zones when preset temperatures of the heat-treatment zones are changed; and
   calculating the correction value based on the obtained degree of interference,
   wherein: obtaining the degree of interference comprises obtaining a matrix showing a relation between a variation of the targeted temperature and a temperature variation of the object to be heat-treated at the plurality of measuring points based on the measured temperature of the object, and
   the correction value is calculated by means of an inverse matrix of the matrix.

2. The temperature control method as claimed in claim 1, comprising:
   generating a model including the heat-treatment zones and the object to be heat-treated based on the targeted temperature of each of the heat-treatment zones and the measured temperature of the object so that the matrix can be obtained by means of the generated model.

3. A temperature control apparatus comprising:
   a temperature adjusting device for controlling temperatures of a plurality of heat-treatment zones in a heat treatment applied to an object to be heat-treated while the object is moved in the plurality of heat-treatment zones; and
   a correcting device for calculating a correction value based on a difference between a measured temperature of the object and a temperature of a desired temperature profile of the object, wherein
   the temperature adjusting device controls the temperatures of the respective heat-treatment zones based on a targeted temperature and a detected temperature of each of the heat-treatment zones and corrects at least one of the targeted temperature and the detected temperature based on the correction value,
   wherein the measured temperature of the heat-treatment object is a temperature measured at at least one of a plurality of measuring points while the object is moved in the plurality of continuous heat-treatment zones,
   wherein the correcting device calculates the correction value based on a degree of interference between the heat-treatment zones at each of the plurality of measuring points of the object to be heat-treated when the targeted temperature is changed, the degree of interference being the degree of influence that the temperature of the object at each of the plurality of measuring points undergoes due to a thermal interference between the heat-treatment zones when preset temperatures of the heat-treatment zones are changed, and
   wherein the correcting device obtains the degree of interference by obtaining a matrix showing a relation between a variation of the targeted temperature and a temperature variation of the object to be heat-treated at the plurality of measuring points based on the measured temperatures of the object while the object is moved in the plurality of heat-treatment zones and calculates the correction value using an inverse matrix of the matrix.

4. The temperature control apparatus as claimed in claim 3, wherein
   the correcting device comprises a model including the heat-treatment zones and the object to be heat-treated obtained based on the targeted temperature of at least one heat-treatment zone and the measured temperature of the object, wherein the matrix is obtained by means of the model.

5. A heat treatment apparatus comprising:
   the temperature control apparatus as claimed in claim 3 or 4; and
   a continuous processing device comprising a plurality of continuous heat-treatment zones and subjected to a temperature control by the temperature control apparatus.

6. A temperature adjusting device for use within a temperature control apparatus which includes a correcting device for calculating a correction value based on a difference between a measured temperature of an object to be heated and a temperature of a desired temperature profile of the object, wherein the temperature adjusting device controls temperatures of a plurality of heat-treatment zones while the object to be heated is moved in the plurality of heat-treatment zones; and further wherein the temperature adjusting device is capable of accepting input from the correcting device, wherein
   the temperature adjusting device controls the temperatures of the respective heat-treatment zones based on a targeted temperature and a detected temperature of each of the heat-treatment zones and corrects at least one of the targeted temperature and the detected temperature based on the correction value,
   wherein the measured temperature of the object to be heated is a temperature measured at one or more of a plurality of measuring points while the object is within a heat-treatment zone,
   wherein the correcting device calculates the correction value based on a degree of interference between the heat-treatment zones at one or more of the plurality of measuring points when the targeted temperature is changed, the degree of interference being the degree of influence that the temperature of the object at each of the plurality of measuring points undergoes due to a thermal interference between the heat-treatment zones when preset temperatures of the heat-treatment zones are changed, and
   wherein the correcting device obtains the degree of interference by obtaining a matrix showing a relation between a variation of the targeted temperature and a temperature variation of the object to be heated at the plurality of measuring points based on the measured temperatures of the object while the object is moved in the plurality of heat-treatment zones and calculates the correction value using an inverse matrix of the matrix.

7. The temperature adjusting device as claimed in claim 6, wherein the correcting device comprises a model including the heat-treatment zones and the object to be heated obtained based on the targeted temperature of each of the heat-treatment zones and the measured temperature of the object, wherein the matrix is obtained using the model.

8. The temperature adjusting device as claimed in claim 6 or 7, wherein the temperature adjusting device is configured for use within a continuous processing device comprising a plurality of continuous heat-treatment zones and subjected to a temperature control by the temperature control apparatus.

* * * * *